United States Patent [19]

Reichman et al.

[11] Patent Number: 4,493,379
[45] Date of Patent: Jan. 15, 1985

[54] CABLE REAMING APPARATUS AND METHOD

[75] Inventors: James M. Reichman, Issaquah; Thomas A. O'Hanlon, Tacoma, both of Wash.; Thomas J. Kendrew, Redwood City, Calif.

[73] Assignee: Electric Power Research Institute, Inc., Palo Alto, Calif.

[21] Appl. No.: 469,951

[22] Filed: Feb. 25, 1983

Related U.S. Application Data

[62] Division of Ser. No. 196,847, Oct. 14, 1980, Pat. No. 4,385,667.

[51] Int. Cl.³ .............................................. E21B 7/00
[52] U.S. Cl. ................................... 175/57; 175/53; 175/67; 254/134.3 FT; 254/134.6
[58] Field of Search ............... 175/57, 53, 65, 67, 175/73, 108, 62, 19; 299/16–18; 254/134.3 CL, 134.3 FT, 134.3 SC, 134.5, 134.6; 173/34, 35; 405/199

[56] References Cited

U.S. PATENT DOCUMENTS

| | | | |
|---|---|---|---|
| 2,349,033 | 5/1944 | Elliott | 175/53 |
| 3,451,491 | 6/1969 | Clelland | 175/53 |
| 3,465,834 | 9/1969 | Southworth, Jr. | 254/134.6 |
| 3,550,698 | 12/1970 | Pauley | 175/57 |
| 4,249,620 | 2/1981 | Schmidt | 175/62 X |

Primary Examiner—Stephen J. Novosad
Assistant Examiner—Thuy M. Bui
Attorney, Agent, or Firm—Flehr, Hohbach, Test, Albritton & Herbert

[57] ABSTRACT

The technique for replacing an existing underground cable and a specific apparatus for doing so are disclosed herein. The apparatus includes a main body or cable follower which is interconnected with the cable to be replaced for slidable movement along the latter. At the same time, the apparatus provides means for reaming around the cable, preferably by means of one or more fluid jets. Once the soil surrounding the cable has been loosened using this apparatus, the cable can be easily pulled out of the ground. At the same time, the replacement cable can be attached to the existing cable and pulled into its place.

6 Claims, 7 Drawing Figures

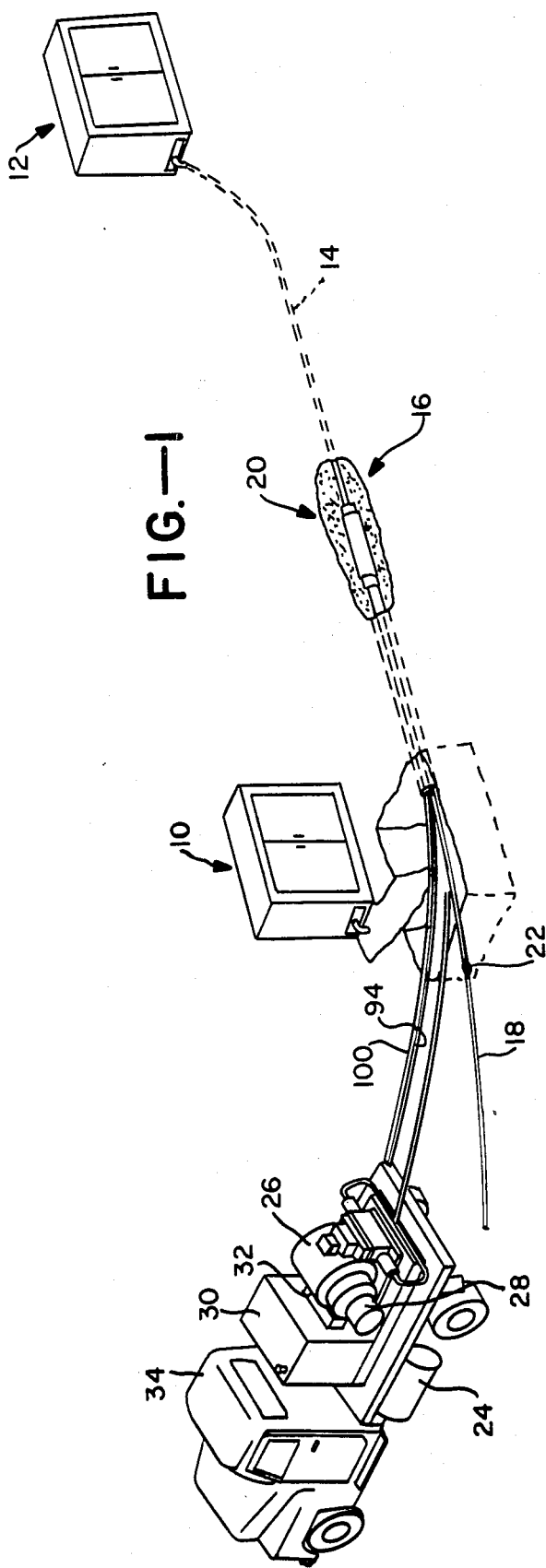
FIG.—1
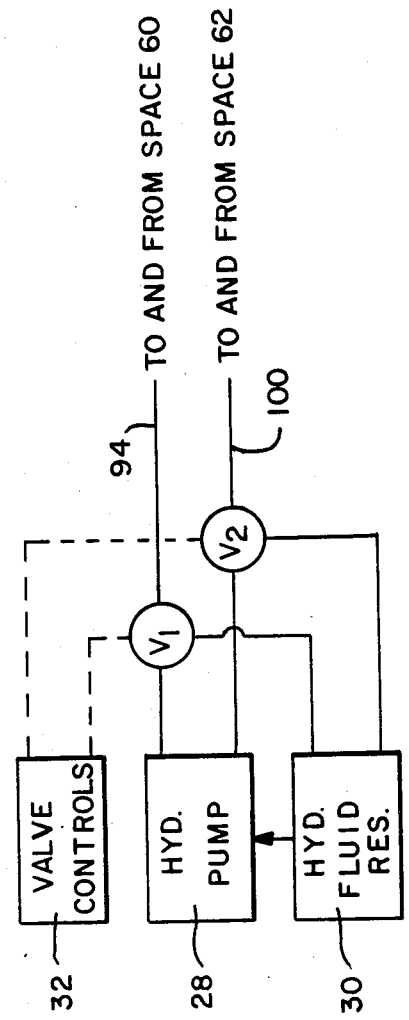
FIG.—7

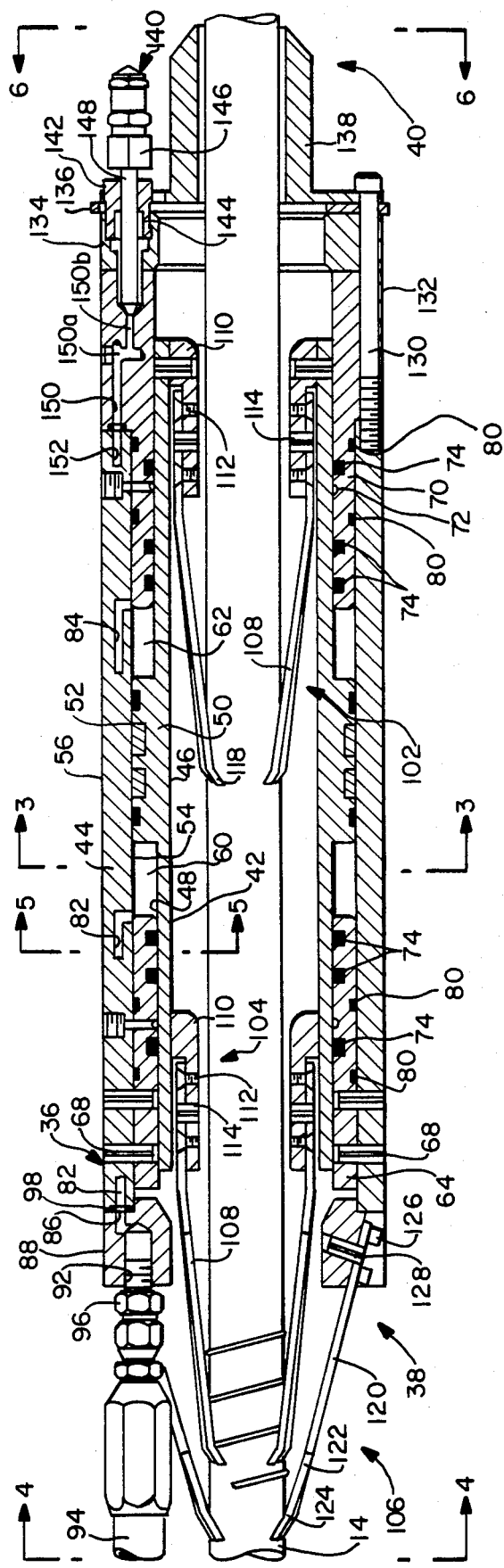
FIG.—2

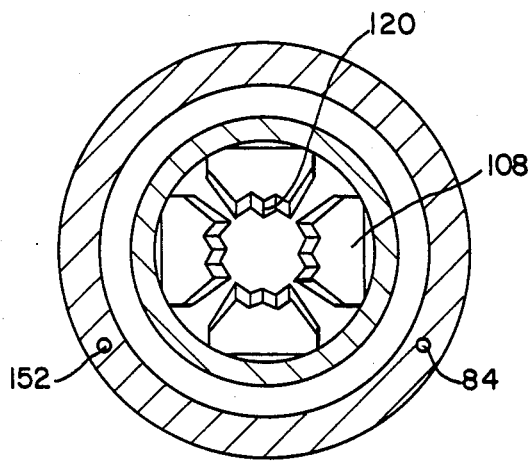
FIG.—3
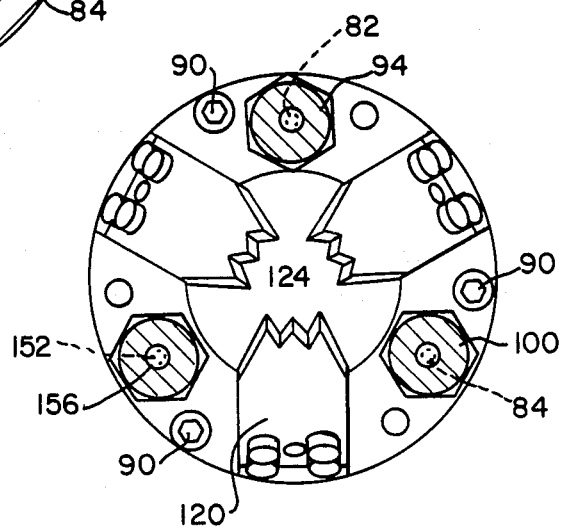
FIG.—4
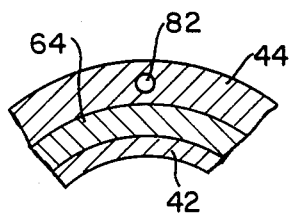
FIG.—5
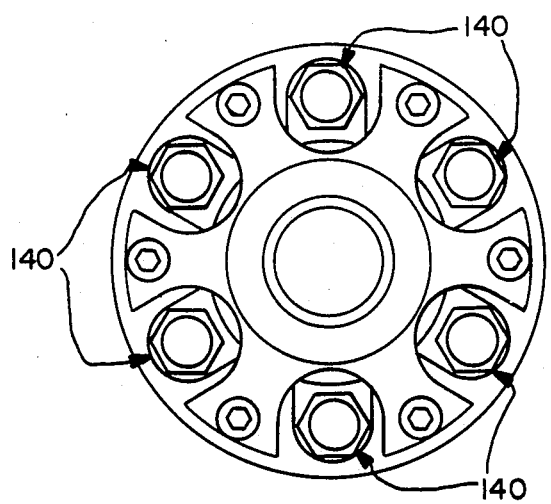
FIG.—6

CABLE REAMING APPARATUS AND METHOD

This is a division of application Ser. No. 196,847 filed Oct. 14, 1980. Now Pat. No. 4,385,667.

The present invention relates generally to providing service cable underground and more particularly to a specific apparatus for and method of removing existing underground cable and replacing it with new cable.

At the present time, there are many thousands of miles of electrical distribution cables as well as other types of service cables buried under the ground. At some point in the future a failure in each of these cables will occur and the failed cable will have to be replaced. Heretofore, most service cables were initially buried in and along trenches across undeveloped land. However, it is most likely that since that time, streets, sidewalks, landscaping and other improvements have been made so as to make the buried cable relatively inaccessible. Nevertheless, one technique for replacing any existing cable is to follow its original trench and retrieve and replace it at the expense of the above ground developments. This, of course, is time consuming, costly and in many cases, quite inconvenient. An alternative to this approach is to utilize a horizontal boring technique which requires digging a pit and using an impacting device to bore a hole. While this technique eliminates the destruction and subsequent restoration of above ground developments, it has the inherent problem of not being directionally controllable and may not exit at the desired point.

In view of the foregoing, an object of the present invention is to provide a technique for replacing underground cable which does not require altering above ground developments and yet one which does not have the control problem inherent with the above-recited horizontal boring technique.

Another object of the present invention is to provide this replacement technique in an uncomplicated, reliable and highly economical manner.

A more specific object of the present invention is to provide a method of and apparatus for loosening the soil around an existing underground cable so that the latter can be easily removed and replaced with a new cable without disturbing the developed land above the cable.

Still another specific object of the present invention is to utilize the existing underground cable itself as a guide in directionally controlling movement of the particular device used in loosening the soil around the cable.

As will be seen hereinafter, the cable replacement technique disclosed herein is one which utilizes an apparatus including a cable follower adapted for connection with the cable to be replaced for slidable movement along the latter. The cable follower is actually moved along and adjacent the entire length of the cable and, as it does so, means are provided for reaming or otherwise loosening the soil surrounding it. After the soil has been loosened, the existing cable can be readily pulled out from one end. At the same time, a second replacement cable can be attached to the opposite end of and be pulled in behind the cable being replaced.

A specific and preferred embodiment of the present invention will be more fully described hereinafter with respect to the drawings wherein:

FIG. 1 is a diagrammatic illustration in perspective view of an overall apparatus for replacing underground cable and particularly illustrated how the cable is replaced;

FIG. 2 is an enlarged sectional view of a cable follower forming part of the apparatus of FIG. 1 and particularly illustrating how the cable follower moves along the underground cable and loosens the soil around it;

FIG. 3 is a cross-sectional view of the cable follower taken along 3—3 in FIG. 2;

FIG. 4 is a cross-sectional view of the cable follower taken generally along line 4—4 in FIG. 2;

FIG. 5 is a cross-sectional view of a portion of the cable follower taken generally along line 5—5 in FIG. 2;

FIG. 6 is a cross-sectional view of the cable follower taken generally along line 6—6 in FIG. 2; and FIG. 7 is a diagrammatic illustration of certain operating components of the apparatus of FIG. 1.

Turning now to the drawings, wherein like components are designated by like reference numerals throughout the various figures, attention is first directed to FIG. 1 which diagrammatically illustrates two spaced transformer stations generally indicated at 10 and 12 and an underground cable 14 extending therebetween. FIG. 1 also diagrammatically illustrates an apparatus generally indicated at 16 for reaming or otherwise loosening the soil around and along the length of cable 14 for making it relatively easy to pull out and replace the latter with a new cable 18. In order to accomplish this, overall apparatus 16 includes a main body or cable follower 20 which is interconnected with and slides along cable 14 from transformer station 10 to transformer station 12. As will be seen, the cable follower carries with it means for reaming or otherwise loosening the soil around and along the length of the underground cable. Once the cable follower reaches station 12 from station 10, cable 14 can be readily pulled out of the ground from one end, for example from station 12 utilizing a suitable device such as a power winch. At the same time, one end of replacement cable 18 can be fastened to the other end of cable 14, for example at station 10, as indicated generally at 22. In this way, as cable 14 is pulled out of the ground, cable 18 is pulled into the ground in its place.

In a preferred and actual working embodiment of the present invention, apparatus 16 utilizes liquid, preferably water, under pressure to loosen the soil around and along the length of cable 14 and hydraulic action to move the cable follower. By utilizing water or other suitable liquid jets to ream around and along the length of the cable, the liquid combines with the loosened soil to form a slurry which surrounds the cable. This helps to maintain the cable in a relatively loose position underground and serves to prevent the ground above the cable from collapsing before the cable can be removed. In this regard, it should be pointed out that the soil initially surrounding the cable is usually relatively free of rocks since the cable as originally installed was most likely placed in an open trench backfilled with soil. This, of course, makes it easier to ream around the cable by means of water jets or the like. Both the water under pressure and the hydraulic fluid, preferably oil, can be portably brought to station 10. As illustrated in FIG. 1, overall apparatus 16 includes a source of high pressure water, that is, a water tank generally indicated at 24 and generally electrically powered water pump 26 for providing water jets for reaming around the soil, as will be seen. The apparatus also includes a hydraulic pump 28 along with a supply of hydraulic fluid 30 and suitable control valves generally indicated at 32, all of which are provided for powering the cable follower. All of these components, that is, the source of high pressure water and the hydraulic components can be carried to the site on a truck 34.

Referring now to FIGS. 2 through 6, attention is specifically directed to cable follower 20 and the way the latter operates to slidably move along and ream around cable 14. As will be discussed below, the cable follower can be separated into three functional components, (1) a main body or drive mechanism 36 which responds to external hydraulic forces to move along cable 14, (2) an arrangement 38 of gripping members for interconnecting the main body or drive mechanism to the cable such that the entire cable follower slidably moves along the length of the cable from one end of the latter to its other end, and (3) means 40 in the form of a nozzle bearing front end cap for receiving a supply of high pressure water or other suitable liquid and converting the latter to a number of high pressure fluid jets for reaming or otherwise loosening the soil surounding the cable.

As seen in FIG. 2 in conjunction with FIGS. 3 and 4, main body 36 of cable follower 20 takes the form of an open ended cylinder which, by means of arrangement 38 to be discussed hereinafter, is concentrically positioned around the cable 14 to be replaced. Main body 36 includes inner and outer, cylindrical sections or drive tubes 42 and 44, rerespectively. Inner drive tube 42 includes an innermost surface 46 and an outward primary surface 48. As seen only in FIG. 2, inner drive tube 42 includes a lengthwise enlarged portion 50 extending radially outwardly from surface 48 so as to define its own outermost cylindrical surface 52 radially outward of surface 48. Outer housing section or drive tube 44 includes an innermost surface 54 and an outermost surface 56. Innermost surface 54 is adapted for slidable engagement against and around surface 52 and therefore has a diameter which is only slightly greater than that of surface 52. As a result, a spacing between surface 48 and surface 54 is significantly greater, e.g. equal to the added thickness of portion 50. This in turn results in annular spaces 60 and 62 on opposite sides of portion 50 between the inner and outer drive tubes.

The annular spaces 60 and 62 which serve hydraulic purposes to be discussed hereinafter are closed at their otherwise opened ends by means of a cylindrical sleeve 64 (in the case of space 60) and by means of nozzle bearing front cap 40 (in the case of space 62). More specifically, as illustrated in FIG. 2, cylindrical sleeve 64 is located concentrically between inner drive tube 42 and outer drive tube 44 rearwardly of space 60 so as to close the rearward end of that annular space. The sleeve is fixedly connected with and comprises part of outer drive tube 44 by means of a plurality of roll pins 68 specifically located within cooperating openings through the outer drive tube and intermediate sleeve. In a preferred embodiment, each of the roll pins and its associated openings are square in crosssectional configuration.

As indicated above, annular space 62 is closed at its otherwise free end, that is, its forwardmost end, by means of nozzle bearing cap arrangement 40 which will be described in more detail hereinafter. For the moment it should suffice to say this arrangement is fixedly connected to the forwardmost end of outer drive tube 44 and includes a rearwardmost cylindrical sleeve 70 which fits concentrically between surfaces 48 and 54 of the inner and outer drive tubes, respectively, so that surface 54 and the innermost surface 72 of sleeve 70 are in slidable engagement with one another.

As will be described in more detail hereinafter, the overall cable follower is moved along cable 14 by alternately sliding inner drive tube 42 and outer drive tube 44 (including sleeve 64 and arrangement 40) relative to one another. As will also be seen, this is accomplished hydraulically by directing liquid under pressure, preferably oil, into and withdrawing it out of the two annular spaces 60 and 62 in an alternating, controlled manner. As a result of this relative sliding movement between the inner and outer drive tubes and the use of hydraulic force, it is necessary to provide an arrangement of annular bearings and seals. As shown in FIG. 2, this arrangement includes a number of annular seals 74 located within respective cooperating grooves in sleeves 64 and 70 between the latter and surface 48 of inner drive tube 42. The bearing and seal arrangement also includes annular bearing and seal members 76 and 78 disposed in their own grooves in the enlarged intermediate portion 50 of body section 42. These latter members act to slidably seal between portion 50 and the inner surface 54 of outer drive tube 44. In addition to the bearing and seal members thus far described, the overall arrangement of these components includes O-rings 80 disposed in their own grooves in sleeves 64 and 70 for sealing between these sleeves and outer drive tube 44.

As stated above, overall cable follower 20 is powered hydraulically by applying liquid under pressure into and withdrawing it from the spaces 60 and 62 in an alternating, controlled manner. In order to deliver this liquid end to withdraw it from the two annular spaces 60 and 62, the latter include respective passageways 82 and 84. As seen best in FIG. 2, the passageway 82 extends from the rearward end of space 60 centrally through the wall of outer drive tube 44 and terminates at the rearward end of outer drive tube 44, generally indicated at 86. The passageway 84 extends from the forwardmost end of annular space 62 through the wall of the outer drive tube 44 and also terminates at end 86, although the point at which this latter passageway terminates is not shown in any of the figures. Nevertheless, the position of passageway 86 along the circumference of outer drive tube 44 relative to the position of passageway 82 is best seen in FIGS. 3 and 4. In FIG. 3 only the passageway 84 is shown whereas in FIG. 4, the circumferential positions of both the passageways are shown. In this regard, for purposes of description, the outlet of each of these latter passageways into their respective annular spaces is shown in a single plane, specifically the plane of FIG. 2. In actuality, the two passageways are 120° from one another around outer drive tube 44 as seen in FIGS. 3 and 4.

In order to deliver the necessary hydraulic fluid to and withdraw it from the annular spaces 60 and 62 through their associated passageways 82 and 84, cable follower 20 includes an annular rearward end cap 88 which fits entirely around and against the rearward end of outer drive tube 44, as seen best in FIG. 2. As seen best in FIG. 4, this end cap is fixedly attached with tube 44 by means of socket type screws 90 extending through the end cap and into the back end of the outer drive tube. Returning to FIG. 2, end cap 88 is shown including its own passageway 92 and an associated hose assembly 94 seal connected in line with passageway 92 by means of a male adapter 96. With end cap 88 suitably maintained in a proper position relative to outer drive tube 44, passageway 92 lines up with passageway 82 so that hydraulic fluid can be delivered into and out of passageway 82 and annular space 60 through passageway 92 and its associated hose 94. In this regard, inlet O-ring 98 is provided in a suitable groove around the passageways 82 and 92 at the interface between the two. Hose 94 extends from its connected end at end cap 86 to its source of controlled hydraulic fluid at truck 34, as best seen in FIG. 1. While not shown in FIG. 2, passageway 84 includes its own associated passageway in end cap 88 and its own associated hose 100, the latter being shown in FIGS. 1 and 4.

In order to slidably move the inner and outer drive tubes 42 and 44 relative to one another for moving the overall cable follower in the manner to be described, the cable follower includes a series of cable gripping arrangements generally indicated at 102, 104 and 106. As best seen in FIG. 3 in conjunction with FIG. 2, arrangement 102 includes four elongated gripping members 108 fixedly connected at their forwardmost ends to a cylindrical cable guide 110 by means of flat head screws 112 and roll pins 114 similar to previously described roll pins 68 but shorter in length. The cable guide itself is fixedly located concentrically within inner drive tube 42 at its forwardmost end by means of still further roll pins 116. The forwardmost end of guide 110 is rounded and serves to guide the forward end of the inner drive tube along cable 14. The rearwardmost end of gripping members 108 are bent radially inward at 118 and carry teeth 120 (FIG. 3) for concentrically positioning the front end of the cable follower around the cable and for preventing the cable follower from moving rearwardly. Arrangement 104 is identical to arrangement 102 but fixedly located near the rearward end of inner drive tube 42 as seen in FIG. 2, although the roll pins 116 to accomplish this are not shown. Arrangement 104 serves to guide the rearward end of inner drive tube 42 in a forward direction along cable 14 while preventing the inner drive tube from moving rearwardly.

Cable gripping arrangement 106 is similar to arrangements 102 and 104 to the extent that arrangement 106 includes a plurality of gripping members. As seen best in FIG. 4, arrangement 106 includes only three gripping members which are generallly indicated at 120. The rearward end of these members also bend inward at 122 and include teeth 124 for engaging the cable 14. The forwardmost end of each of these gripping members is fixedly attached to previously described rear end cap 88 by means of socket head screws 126 and further roll pins 128. Gripping members 120 serve to slidably maintain the rearward end of outer drive tube 44 concentrically around cable 14 as the inner drive tube moves forward while preventing the outer drive from moving rearwardly.

Having described main body 36, the way it receives hydraulic fluid using hoses 94 and 100 and the way it is concentrically positioned around cable 14 by means of cable gripping arrangements 102, 104 and 106, attention is now directed to nozzle bearing cap arrangement 40 which is also shown best in FIG. 2. As described previously, this arrangement includes a rearwardmost cyclindrical sleeve 70 located concentrically between inner and outer drive tubes 42 and 44, at the front ends of the latter. As also stated, sleeve 70 (in fact, the entire cap arrangement 40) is fixedly connected with the outer drive tube 44. This is accomplished by means of a plurality of socket head screws 130 extending through an enlarged section of the cap arrangement indicated at 132 and threaded into cooperating openings in outer drive tube 44. Only one of these screws is shown in FIG. 2, although five others are shown in the end view of FIG. 6.

As seen best in FIG. 2 in conjunction with FIG. 6, arrangement 40 also includes a nozzle ring 134, a stand off collar 136 and shroud 138 which are assembled together in the manner shown in FIG. 2 and fixedly connected to the front end of sleeve 70 by means of previously described screws 130. Arrangement 40 also includes fixed nozzle assemblies, each of which is generally indicated at 140 in FIG. 6. As will be seen below, each of these assemblies is provided for applying a high pressure fluid jet in front of the cable follower as the latter moves along cable 14 for loosening and washing away the soil around the latter.

Returning to FIG. 2, one of the nozzle arrangements 114 is shown in detail. As seen there, this arrangement includes a gland 142 carrying a rearward collar 144 mounted in a cooperating opening in nozzle ring 134. The nozzle 146 is mounted in place in front of its associated gland 142 by means of a nozzle adapter 148. The nozzle and its adapter are maintained in fluid communication with a cooperating passageway 150 extending axially through the enlarged portion 132 of sleeve 70. The rearwardmost end of passageway 150 is connected to still another passageway 152 which like previously described passageways 82 and 84 extends entirely through outer drive tube 44. The position of passageway 152 relative to passageways 82 and 84 is best seen in FIG. 3. O-ring 154 is provided at the innerface between passageways 150 and 152 for sealing around the innerface.

As seen best in FIGS. 2 and 4, the rearwardmost end of passageway 152 is connected to a third hose 156 which may be similar or identical to the previously described hoses 94 and 100. The hose 156 and its associated passageway 152 are interconnected together through rear end cap 88 in the same manner as hoses 94 and 100. The nozzle arrangements 140 not shown in FIG. 2 are identical to the nozzle arrangement 140 described. However, all of these arrangements utilize a single pasageway 150, the single passageway 152 and hose 156. In order to accomplish this, passageway 150 includes an annular section 150A and individual subsections 150B which extend from the annular section 68 to the respective nozzle adapters 148.

Having described cable follower 20 structurally, attention is now directed to the manner in which it is caused to move along cable 14. For purposes of convenience, let it be assumed that the cable follower is initially in the position shown in FIG. 2. The first step in moving the cable follower forward from this position is to inject under pressure hydraulic fluid, specifically oil in a preferred embodiment, into annular space 60. As the hydraulic fluid fills this space, it applies an axially forward force against the back side of enlarged portion 50 as indicated by the arrow causing the entire inner drive tube 42 to slide forward relative to outer drive tube 44. This is because the outer drive tube 44 and its associated sleeve 64 are prevented from moving rearwardly by cable gripping arrangement 106. The forward movement of the inner drive tube continues until the forwardmost end of enlarged portion 50 engages against the rearward end of sleeve 70. This, in turn, causes the annular space 62 to substantially close.

After inner drive tube 42 is moved forward an incremental step. hydraulic fluid under pressure is injected into substantially closed space 62, causing the latter to open by forcing outer drive tube 44 forward relative to inner drive tube 42. This occurs because the incoming fluid acts against the forwardmost side of enlarged portion 50 as indicated by the arrow. Because the inner body section is prevented from moving rearwardly by means of cable gripping arrangements 102 and 104, the outer body section is moved forward. This forward movement continues until the forwardmost end of sleeve 64 engages the rearward end of enlarged portion 50. As this occurs, space 60 is caused to substantially close which, in turn, forces the hydraulic fluid previously in this space out of the latter through passageway 82 and its associated hose 94.

The way in which the overall cable follower 20 moves two incremental steps forward has been described above. This procedure is continuously repeated such that hydraulic fluid first enters each space and is thereafter forced out of each space as the latter opens and closes. In this regard, it should be evident that a series of valves are necessary to control the way in which the hydraulic fluid is alternately applied to and withdrawn from each annular space. These valves are generally indicated at 32 in FIG. 1 and may be readily provided by those with ordinary skill in the art based on the way in which they must open and close to apply hydraulic fluid into and withdraw the fluid from the spaces 60 and 62, as described above. One way in which this could be accomplished is diagrammatically illustrated in FIG. 7.

Previously recited hydraulic pump 28 and associated hydraulic fluid reservoir 30 are shown along with a first two-way control valve $V_1$ and a second two-way control valve $V_2$ and previously recited valve controls 32. The valves themselves could be electrically actuated solenoid valves and the controls could be conventional circuitry. Using the scheme diagrammatically illustrated in FIG. 7, when the inner drive tube 42 is to be moved forward valve $V_1$ would be maintained open between pump 28 and hose 94 while valve $V_2$ would be maintained open between the hydraulic fluid reservoir, 28a and hose 100. In this way hydraulic fluid is applied from pump 28 into space 60 while hydraulic fluid from space 62 is withdrawn out of the latter and into the reservoir. Thereafter, the position of each of the valves is reversed, that is, $V_1$ is opened between reservoir 28a and hose 94 and $V_2$ is open between the hydraulic pump and hose 100. In this way hydraulic fluid is directed into the opening 62 from the hydraulic pump while hydraulic fluid is forced out of space 60 into the hydraulic fluid reservoir. Conventional electric control circuitry can be readily provided to operate control valves $V_1$ and $V_2$ in this way. In addition, the valves themselves could be readily provided and while not shown a central turn-off valve could be provided.

While not shown, control assembly 32 could also include suitable means for applying fluid under pressure, e.g. water, from water pump 24 and its associated reservoir to the various nozzle arrangements 140. In order to accomplish this, a two-way valve (one which opens and closes) could be utilized along with suitable control circuitry to open and close it. Apparatus 20 preferably operates such that the nozzle assemblies 140 would continuously maintain fluid jets as the cable follower moves along cable 14.

What is claimed:

1. A method of replacing an existing underground cable comprising the steps of reaming through the soild around and along the length of said cable from one end of the latter to its other end; attaching one end of a replacement cable to one end of said existing cable; and after attaching said cables and reaming through said soil, pulling said existing cable out of the ground from its otherwise free end, thereby causing the attached replacement cable to move into the space previously occupied by the removed cable.

2. A method according to claim 1 wherein said reaming step includes the steps of providing a soil reaming device, interconnecting said device to said cable such that said device is slidable along the length of said cable from one end of the latter to its other end, and sliding said device along said cable from said one end to the other while reaming through said soil.

3. A method of loosening an existing underground cable for removing the latter, said method comprising the steps of: providing a soil reaming device; interconnecting said device to said cable such that said device is slidable along the length of said cable from one end of the latter to its other end; sliding said device along said cable from one end to its other end; and reaming through the soil surrounding said cable as said device moves along the latter, whereby the cable may be readily pulled out of the ground.

4. A method of replacing an existing underground cable comprising the steps of cutting through the soil around and along the length of said cable from a first end of the cable at a first point in the ground to a second end of the cable at a second point in the ground; thereafter, pulling said existing cable out of the ground from one of its ends; and with a replacement cable initially positioned adjacent one of said first and second points, pulling said replacement cable into the space vacated by the first-mentioned cable from the other of said points.

5. A method according to claim 4 wherein said replacement cable is initially disposed adjacent said first point and pulled into the space vacated by the first-mentioned cable at said second point.

6. A method according to claim 5 wherein said replacement cable is pulled into the space vacated by the first-mentioned cable by attaching one end of the replacement cable to the first end of said first-mentioned cable before the latter is pulled out of the ground, whereby the replacement cable is pulled into position by and as the first-mentioned cable is pulled out of the ground.

* * * * *